US012673903B2

(12) United States Patent
Lewis et al.

(10) Patent No.: US 12,673,903 B2
(45) Date of Patent: Jul. 7, 2026

(54) LIGNIN-UREA AGRICULTURAL FERTILIZER

(71) Applicant: Sustainable Fiber Technologies, LLC, Renton, WA (US)

(72) Inventors: Mark Lewis, Renton, WA (US); Jessica Lewis, Renton, WA (US); Sabrina Burkhardt, Renton, WA (US)

(73) Assignee: SUSTAINABLE FIBER TECHNOLOGIES, LLC, Renton, WA (US)

( * ) Notice: Subject to any disclaimer, the term of this patent is extended or adjusted under 35 U.S.C. 154(b) by 1166 days.

(21) Appl. No.: 17/621,223

(22) PCT Filed: Jun. 26, 2020

(86) PCT No.: PCT/US2020/039858
§ 371 (c)(1),
(2) Date: Dec. 20, 2021

(87) PCT Pub. No.: WO2020/264322
PCT Pub. Date: Dec. 30, 2020

(65) Prior Publication Data
US 2022/0348514 A1 Nov. 3, 2022

Related U.S. Application Data

(60) Provisional application No. 62/868,361, filed on Jun. 28, 2019.

(51) Int. Cl.
*C05B 7/00* (2006.01)
*A01C 23/04* (2006.01)
(Continued)

(52) U.S. Cl.
CPC .............. *C05B 7/00* (2013.01); *A01C 23/047* (2013.01); *C05C 9/00* (2013.01); *C08H 6/00* (2013.01)

(58) Field of Classification Search
CPC .. C05B 7/00; C05C 9/00; C05C 9/005; C08H 6/00; A01C 23/047
See application file for complete search history.

(56) References Cited

U.S. PATENT DOCUMENTS

| | | | |
|---|---|---|---|
| 2,592,983 A | 4/1952 | Von Hilderbrandt | |
| 4,372,811 A | 2/1983 | Samuelson et al. | |
| (Continued) | | | |

FOREIGN PATENT DOCUMENTS

| | | |
|---|---|---|
| CA | 2434215 | 1/2004 |
| CA | 2760840 | 3/2011 |
| (Continued) | | |

OTHER PUBLICATIONS

"Improvement of hydrophobicity of urea modified tapioca starch film with lignin for slow release fertilizer," Ariyanti et al., Trans Tech Publications, Dec. 27, 2012.*

(Continued)

*Primary Examiner* — Amber R Orlando
*Assistant Examiner* — Heather Elise Silva Rainbow
(74) *Attorney, Agent, or Firm* — Emerson, Thomson & Bennett, LLC; Roger D. Emerson; Peter R. Detorre

(57) ABSTRACT

Provided is a solvent borne fertilizer composition. The fertilizer composition includes a low molecular weight lignin in an amount of 5 or about 5 to 25 or about 25 weight percent solids, a carbohydrate in an amount of 1 or about 1 to 20 or about 20 weight percent solids, wherein the lignin and carbohydrate form a lignin-carbohydrate mixture; and a urea moiety bonded to the lignin-carbohydrate mixture.

23 Claims, 1 Drawing Sheet

Biomass Substrate Samples – organic GPC analysis

| Sample | Mn | Mw | PD |
|---|---|---|---|
| Wheat | 510 | 1400 | 2.8 |
| Bagasse | 600 | 2100 | 3.5 |
| Miscanthus | 350 | 870 | 2.5 |

Mn: number average molecular weight, Mw: Weight average molecular weight, PD: Polydispersity

(51) Int. Cl.
    *C05C 9/00*      (2006.01)
    *C08H 7/00*      (2011.01)

(56) References Cited

U.S. PATENT DOCUMENTS

| | | | |
|---|---|---|---|
| 4,698,225 A | 10/1987 | Morrison | |
| 4,728,393 A | 3/1988 | Peel | |
| 4,746,449 A | 5/1988 | Peel | |
| 4,786,438 A | 11/1988 | Blackmore | |
| 4,824,588 A | 4/1989 | Lin | |
| 4,871,825 A | 10/1989 | Lin | |
| 4,952,415 A | 8/1990 | Winowiski et al. | |
| 4,988,520 A | 1/1991 | Overton | |
| 4,996,065 A | 2/1991 | Van de Walle | |
| 5,010,156 A | 4/1991 | Cook | |
| 5,281,434 A | 1/1994 | Winowiski et al. | |
| 5,312,632 A | 5/1994 | Simsa | |
| 5,595,628 A | 1/1997 | Gordon et al. | |
| 5,714,184 A | 2/1998 | Major | |
| 5,786,007 A | 7/1998 | Webb | |
| 6,013,116 A | 1/2000 | Major | |
| 6,113,974 A | 9/2000 | Winowiski et al. | |
| 6,464,827 B1 | 10/2002 | Colodette | |
| 6,506,318 B1 | 1/2003 | Sapienza et al. | |
| 6,605,232 B1 | 8/2003 | Montgomery et al. | |
| 7,070,709 B2 | 7/2006 | Schilling | |
| 7,514,018 B2 | 4/2009 | Schilling | |
| 8,268,121 B2 | 9/2012 | Blount | |
| 8,574,631 B2 | 11/2013 | Anderson | |
| 9,133,378 B2 | 9/2015 | Maslow | |
| 9,315,427 B2 | 4/2016 | Foody | |
| 9,834,486 B2* | 12/2017 | Lopez Villanueva | C09K 17/32 |
| 11,033,867 B2 | 6/2021 | Lewis | |
| 11,091,697 B2 | 8/2021 | Lewis | |
| 2002/0061583 A1* | 5/2002 | Kawamura | C08L 67/02 |
| | | | 435/255.1 |
| 2003/0156970 A1 | 8/2003 | Oberkofler et al. | |
| 2005/0247907 A1 | 11/2005 | Sapienza et al. | |
| 2006/0202156 A1 | 9/2006 | Sapienza et al. | |
| 2007/0095118 A1* | 5/2007 | Evers | C05B 1/04 |
| | | | 71/28 |
| 2008/0098782 A1* | 5/2008 | Urano | C05F 3/00 |
| | | | 71/21 |
| 2008/0121356 A1 | 5/2008 | Griffith | |
| 2009/0314983 A1 | 12/2009 | Sapienza et al. | |
| 2011/0003352 A1 | 1/2011 | Retsina | |
| 2011/0073796 A1 | 3/2011 | Dunuwila | |
| 2012/0103039 A1 | 5/2012 | Brucher | |
| 2012/0108798 A1 | 5/2012 | Wenger et al. | |
| 2012/0301598 A1 | 11/2012 | Karges et al. | |
| 2013/0126781 A1* | 5/2013 | Boote | A01K 1/0155 |
| | | | 252/184 |
| 2013/0175467 A1 | 7/2013 | Bradt et al. | |
| 2013/0217868 A1 | 8/2013 | Fackler | |
| 2014/0249271 A1 | 9/2014 | Pietarinen | |
| 2014/0288285 A1 | 9/2014 | Ters | |
| 2014/0315254 A1 | 10/2014 | Gao | |
| 2014/0316162 A1 | 10/2014 | Gao | |
| 2014/0329999 A1 | 11/2014 | Friedl | |
| 2015/0000356 A1 | 1/2015 | Foody | |
| 2015/0122429 A1 | 5/2015 | Dybov | |
| 2015/0152017 A1* | 6/2015 | Schumski | C05C 3/00 |
| | | | 71/24 |
| 2015/0158776 A1* | 6/2015 | Wells | C05B 7/00 |
| | | | 71/23 |
| 2015/0203774 A1 | 7/2015 | Lake | |
| 2016/0130489 A1 | 5/2016 | Gilmour | |
| 2016/0176767 A1 | 6/2016 | Foody | |
| 2016/0229880 A1 | 8/2016 | Pietarinen | |
| 2016/0237194 A1 | 8/2016 | Pietarinen | |
| 2016/0244650 A9 | 8/2016 | Pylkkanen | |
| 2016/0257791 A1 | 9/2016 | Pietarinen | |
| 2017/0226330 A1 | 8/2017 | Knudsen | |
| 2018/0002451 A1 | 1/2018 | Ge | |
| 2019/0062508 A1 | 2/2019 | Winsness | |

| | | | |
|---|---|---|---|
| 2019/0091643 A1 | 3/2019 | Lewis |
| 2019/0153280 A1 | 5/2019 | Lewis |
| 2019/0161678 A1 | 5/2019 | Lewis |
| 2020/0369932 A1 | 11/2020 | Kuykendall |

FOREIGN PATENT DOCUMENTS

| | | |
|---|---|---|
| CA | 2936029 | 7/2015 |
| CN | 1042743 | 6/1990 |
| CN | 1438385 | 8/2003 |
| CN | 102746052 | 10/2012 |
| CN | 102704296 | 6/2014 |
| CN | 104628482 | 2/2015 |
| CN | 105130682 | 12/2015 |
| CN | 106495847 | 3/2017 |
| CN | 107382500 | 11/2017 |
| CN | 107417428 | 12/2017 |
| DE | 102009051884 | 5/2011 |
| EP | 2831088 | 2/2018 |
| FR | 2673941 | 9/1992 |
| WO | 2002037981 | 5/2002 |
| WO | 20120137204 | 10/2012 |
| WO | 20140124401 | 8/2014 |
| WO | 2015023580 | 2/2015 |
| WO | 2015104296 | 7/2015 |

OTHER PUBLICATIONS

"Lignin, alkali," Sigma Aldrich, retrieved from sigmaaldrich.com.*
"Characterization of Chicken Manure from Manjung Region," Singh et al., IOP Conference Series, Materials Science and Engineering (Year: 2018).*
"Characterization of Lignins Isolated from Industrial Residues and their Beneficial Uses," Sameni et al., BioResources (Year: 2016).*
"Anthraquinone: a review of the rise and fall of a pulping catalyst," Hart et al., Peer-Reviewed Pulping, Oct. 2014.*
International Search Report and Written Opinion for corresponding PCT Application No. PCT/US2020/039858 mailed Oct. 21, 2020.
"Isolation and Characterization of organosolv lignin under alkaline condition form wheat straw" (J. M. Lawther, R. C. Sun, W. B. Banks, Int. J. of Polymer Analysis and Characterization, 3:2, 159-175 (1997).
Sun, Run-Cang and Lawther, J. Mark. "Isolation and Characterization of Organosolv Lignins from Wheat Straw". School of Agricultural and Firest Sciences University of Wales, Bangor, Gwynedd, UK, Wood and Fiber Science, 30(1) 1998 pp. 56-63, 1998 Society of Wood Science and Technology.
International Search Report and Written Opinion for PCT App. No. PCT/US2020/039844 mailed Oct. 22, 2020.
Pan et al., Biotechnology and Bioengineering, vol. 94, No. 5 Aug. 5, 2006, p. 851-861.
Sodium Bicarbonate (https://pubchem.ncbi.nlm.nih.gov/compound/516892, created Mar. 27, 2005).
Lora, Jairo. "Monomers, Polymers and Composites from Renewable Resources", "Chapter 10—Industrial Commercial Lignins: Sources, Properties and Applications" 2008, pp. 225-241.
Lora, J. H. "Lignin Properties and Materials", "Chapter 23—Characteristics and Potential Applications of Lignin Produced by an Organosolv Pulping Process", 1989 American Chemical Society, pp. 312-323.
Nitsos, Christos, "Organosolv Fractionation of Softwood Biomass for Biofuel and Biorefinery Applications", Energies MDPI, Published Dec. 27, 2017.
Lindner, Albert and Wegener, Gerd, Characterization of Lignins from Organosolv Pulping According to the Organocell Process Part 1. Elemental Analysis, Nonlignin Portions and Functional Groups, Journal of Wood Chemistry and Technology, vol. 8, 1988—Issue 3, Dec. 13, 2006.
Lawther, J. Mark; Sun, Run-Cang & Banks, W.B., Isolation and Characterization of Organosolv Lignin under Alkaline Condition from Wheat Straw. International Journal of Polymer Analysis and Characterization vol. 3, 1997, published online Sep. 24, 2006.

* cited by examiner

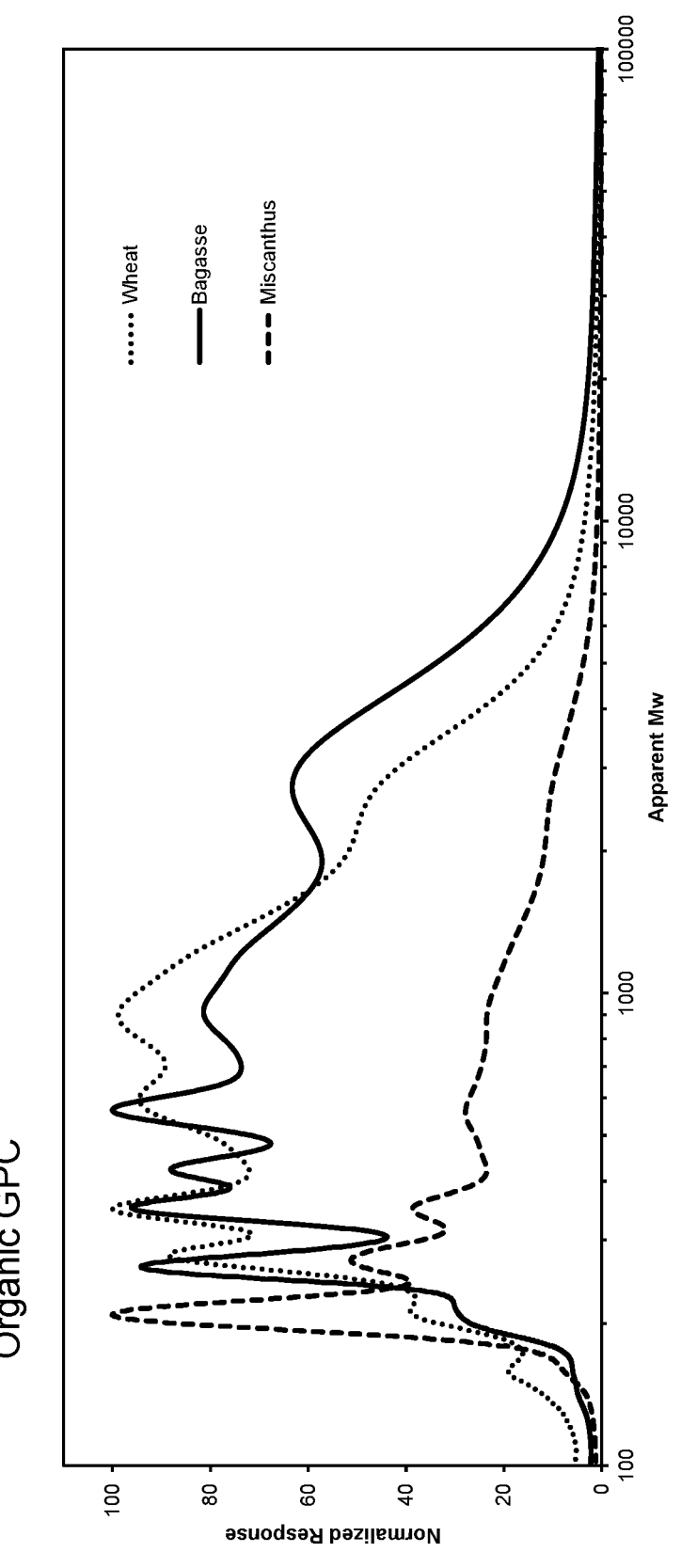
Biomass Substrate Samples – organic GPC analysis
Organic GPC
| Sample | Mn | Mw | PD |
|---|---|---|---|
| Wheat | 510 | 1400 | 2.8 |
| Bagasse | 600 | 2100 | 3.5 |
| Miscanthus | 350 | 870 | 2.5 |
*Mn*: number average molecular weight, *Mw*: Weight average molecular weight, PD: Polydispersity

LIGNIN-UREA AGRICULTURAL FERTILIZER

I. BACKGROUND

A. Field

The present disclosure relates generally to lignin-urea agricultural fertilizer compositions including a sulfur free, lignin-carbohydrate byproduct of cellulose production.

B. Description of the Related Art

It is desirable within the fertilizer industry to provide fertilizers which provide a good source of nitrogen for stimulating the growth and improving the overall health of plants. Fertilizers which utilize ammonium nitrate or urea as a source of nitrogen are known in the art. In particular, urea, by itself, is highly soluble in water. Accordingly, application of urea by itself or typical urea-based fertilizers can result in rapid dissolution within water and migration to the subsoil rendering repeated application necessary.

This problem associated with the high solubility of urea is typically overcome by providing a fertilizer capable of providing a slow or extended release of nitrogen upon application. This problem was addressed in U.S. Patent Publication No. 2012/0103039 to Brucher which is herein incorporated by reference in its entirety. U.S. Patent Publication No. 2012/0103039 provides for a coating including at least one resin acid and at least one inorganic salt or a second lignin compound. The coating is applied to a fertilizer including a lignosulphonate and urea. The coating is hydrophobic in nature and is of low solubility which has the effect of increasing the slow-release properties of the fertilizer and thus, the release of nitrogen from urea to the plant.

The fertilizer disclosed herein provides an alternative type of slow-release urea-based fertilizer including a lignin compound which does not require a coating, does not include significant amounts of sulfur, which is capable of binding to urea without significant precipitation and which provides the benefit of a high nitrogen content urea-based fertilizer without the unpleasant odor typically associated with ammonia or urea. The fertilizer composition disclosed herein incorporates a stable aqueous lignin and hemicellulose dispersion, an example of which is disclosed within U.S. patent application Ser. No. 16/142,683, now published as U.S. Patent Pub. No. 2019/0091643, which is hereby incorporated by reference in its entirety. It is submitted that the present fertilizer composition provides all of the desired properties mentioned above which are sought after in a urea-based fertilizer.

SUMMARY

Provided is a fertilizer composition. The fertilizer composition includes a solvent borne blend of solids, the solids including: (i) a lignin in an amount of 5 or about 5 (or 10 or about 10 or 15 or about 15 or 20 or about 20 or 25 or about 25) to 30 or about 30 weight percent solids; (ii) a carbohydrate in an amount of 1 or about 1 (or 5 or about 5 or 10 or about 10 or 15 or about 15) to 20 or about 20 (or 10 or about 10 or 15 or about 15 or 18 or about 18) weight percent solids, wherein the lignin and carbohydrate form a lignin-carbohydrate mixture; and (iii) a urea moiety bonded to the lignin-carbohydrate mixture; wherein the solvent includes water; and wherein the fertilizer composition has a pH in the range of 5.5 or about 5.5 to 8.5 or about 8.5.

According to certain aspects of the present disclosure, the lignin-carbohydrate mixture is a blend or a copolymer of lignin and carbohydrate.

According to further aspects of the present disclosure, the carbohydrate is hemicellulose.

According to further aspects of the present disclosure, at least 90 weight % (or 95 or 97 or 98 or 99 weight %) of the carbohydrate is derived from hemicellulose.

According to further aspects of the present disclosure, the lignin and carbohydrate comprise less than 2 weight percent, less than 0.5 weight %, less than 0.2 weight % or less than 0.1 weight % or less than 1000 ppm sulfur.

According to further aspects of the present disclosure, the lignin has less than 3500 Da average molecular weight (or 2500 or 1500 Da).

According to further aspects of the present disclosure, the solids are substantially free of monosaccharides in that the solids comprise monosaccharides in an amount of less than 0.1 weight % (or 0.2 or 0.5 or 1.0 or 2.0 weight %) solids.

According to further aspects of the present disclosure, substantially all of the hemicellulose and substantially all of the lignin is derived from a non-wood source and wherein the non-wood source of lignin and hemicellulose is selected from the group consisting of wheat straw, rice straw, barley straw, oat straw, rye grass, coastal Bermuda grass, *Arundo donax*, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and, flax straw.

According to further aspects of the present disclosure, the fertilizer composition is substantially free of anthraquinone.

According to further aspects of the present disclosure, the composition includes phosphates.

According to further aspects of the present disclosure, the nitrogen content ranges between 10 or about 10 to 25 or about 25 weight percent.

According to further aspects of the present disclosure, the fertilizer composition does not exhibit an ammonia odor or scent.

According to further aspects of the present disclosure, the fertilizer composition may be provided in solid form by spray drying or pelletizing.

Also provided is a method for preparing a slow-release solvent borne fertilizer. The method includes the following steps: providing a lignin-carbohydrate solution; applying urea to the lignin-carbohydrate solution; applying an oxy acid to the lignin-carbohydrate solution; applying a chelant to the lignin-carbohydrate solution; allowing the solution to react at a temperature ranging from 60 or about 60 to 120 or about 120 degrees Celsius; and allowing the reaction to occur for a duration of about to two hours.

According to certain aspects of the present disclosure, the oxy acid is peracetic acid or hydrogen peroxide.

According to further aspects of the present disclosure, the oxy acid is 5% peracetic acid.

According to further aspects of the present disclosure, the chelant is diethylenetriaminepentaacetic acid (DTPA).

According to further aspects of the present disclosure, the solvent borne fertilizer is converted to a solid form fertilizer by spray drying or pelletizing.

BRIEF DESCRIPTION OF THE DRAWINGS

FIG. 1 is a graph which shows the number average molecular weight, weight average molecular weight, and polydispersity of wheat, bagasse and miscanthus.

DETAILED DESCRIPTION

The present disclosure provides a lignin-urea agricultural fertilizer composition. The fertilizer may be manufactured in the form of a liquid or a solid. In liquid form, the fertilizer includes a solids component dispersed or suspended in a solvent. In most cases, the solvent may be water or a water-based liquid. The solids component includes a lignin-carbohydrate mixture, which, for purposes of the present disclosure may encompass a physical blend of lignin and a carbohydrate and/or a copolymer of lignin and a carbohydrate. The fertilizer composition is manufactured by combining lignin and urea in the presence of an oxy acid and may further include at least one of a chelant and a phosphate. Other optional components of the fertilizer composition include one or more inorganic salts, organic salts, crosslinking agents, and/or surfactants.

As described below, the carbohydrate may include hemicellulose. For purposes herein, the term "hemicellulose" refers to the polysaccharides and oligosaccharides from wood and non-wood sources.

Solids

As previously noted, the solids portion of the liquid fertilizer composition includes a mixture of lignin and carbohydrates. In certain embodiments, the lignin-carbohydrate mixture generally includes a lignin-hemicellulose mixture. The lignin-hemicellulose mixture may include a physical blend of lignin and hemicellulose or a lignin-hemicellulose copolymer.

Lignin-Hemicellulose Mixture

The composition of the fertilizer disclosed herein includes a lignin-carbohydrate mixture in an amount ranging from about 1 or 1 weight % (or about 5 or 5 or about 10 or 10 or about 15 or 15 or about 20 or 20 or about 25 or 25) to about 30 or 30 weight % solids. In an alternative embodiment, the lignin-carbohydrate mixture may be in an amount ranging from 5 or about 5 weight % to 15 or about 15 weight % solids. In a further alternative embodiment, the lignin-carbohydrate mixture may be in an amount ranging from 10 or about 10 weight % to 15 or about 15 weight % solids.

The lignin component of the lignin-carbohydrate mixture of the fertilizer may be derived from any of a variety of wood and non-wood sources through a number of processes to separate lignin from cellulose pulp. The distinction between wood and non-wood sources of lignin is known in the art and is not further delineated herein. In one embodiment, the lignin may be derived from a non-wood source. In another embodiment, greater than 80 or 85 or 90 or 95 or 99 weight % of the lignin may be derived from a non-wood source. In still a further embodiment, all or substantially all (i.e., greater than 99 weight %) of the lignin may be derived from a non-wood source. Particularly useful non-wood sources of lignin may include agricultural products and grasses and may include species such as wheat straw, rice straw, barley straw, oat straw, rye grass, coastal Bermuda grass, *Arundo donax*, miscanthus, bamboo, sorghum, banana harvest residue, pineapple residue, nut shell waste, sugarcane bagasse, industrial hemp, recreational cannabis waste, kenaf, switchgrass, succulents, alfalfa, corn stover, and flax straw. Lignin from wood sources may include lignin derived from hardwood and softwood species.

Lignin molecular weight is known to vary in spent pulping liquors. As the lignin increases in molecular weight, it may precipitate out of solution or cause increases in viscosity which may cause challenges in spraying the fertilizer composition. Without the addition of polyelectrolytic functional groups, such as sulfonic groups, lignin becomes less soluble in water at increasing molecular weights. However, it is also desirable to keep the amount of sulfur within the composition relatively low (e.g., less than 1000 ppm) or to eliminate it entirely to minimize or eliminate toxicity associated with sulfur-containing compounds. Accordingly, in some embodiments, the average molecular weight of the lignin provided in the fertilizer composition may not exceed 3500 Da (or 2500 or 1500 Da) and will include less than 0.01% by weight of sulfonic groups. For example, the weight average molecular weight distribution of wheat straw, bagasse and miscanthus is provided within FIG. 1.

According to certain aspects of the present teaching, the lignin acts as a binding agent, enhancing the effectiveness of the fertilizer composition.

According to further aspects of the present teaching, the lignin acts as a pH adjuster in acidic soils.

According to further aspects of the present teaching, the lignin acts as a "slow-release" applicator of the fertilizer composition. Without being bound by any particular theory, the slow-release properties of the fertilizer composition are believed to be the result of the partial nitrogen bonding between the lignin and the urea. These nitrogen bonds between the lignin and the urea must be broken down in order to release nitrogen to the plant resulting in slow-release fertilization.

According to further aspects of the present teaching, the lignin may constitute a mineral source for the fertilizer composition. For example, the lignin may include minerals sourced from non-wood biomass. Examples of such minerals include but are not limited to calcium, phosphorus, magnesium, potassium, sodium, iron, zinc, copper, manganese, molybdenum, cobalt, chromium, sulfur and chloride.

Below is a table showing the inorganic mineral and compositional profile of liquid wheat straw which is similar to that of other non-wood sources. As shown within the table below, no heavy metals and no toxic metals are present.

| Components | As Fed | DM |
|---|---|---|
| % Moisture | 71.1 | |
| % Dry Matter | 28.9 | |
| % Crude Protein | 1.5 | |
| % Crude Fat | 0.7 | 2.3 |
| % Ash | 13.8 | 47.81 |
| % TDN | 13 | 46 |
| NEL, Mcal/Lb | 0.14 | 0.48 |
| NEM, Mcal/Lb | 0.12 | 0.40 |
| NEG, Mcal/Lb | 0.05 | 0.16 |
| % calcium | 0.03 | 0.11 |
| % phosphorus | 0.02 | 0.06 |
| % magnesium | 0.01 | 0.05 |
| % potassium | 0.55 | 1.92 |
| % sodium | 3.426 | 11.872 |
| PPM iron | 99 | 344 |
| PPM zinc | 1 | 5 |
| PPM copper | 1 | 4 |
| PPM manganese | 11 | 37 |
| PPM molybdenum | <0.1 | <0.1 |
| PPM cobalt | 0.08 | 0.27 |
| PPM chromium | 0.38 | 1.32 |
| % sulfur | 0.04 | 0.12 |
| % chloride ion | 0.02 | 0.07 |
| DCAD, mEq/100 g | | 556 |
| % Est. Carbs. | 13.0 | 44.9 |

The solids of the fertilizer composition will further include a carbohydrate compound, which in one embodiment, may include hemicellulose, that is, polysaccharides and oligosaccharides derived from wood or non-wood sources. For purposes herein, the term hemicellulose does not include monosaccharides. The hemicellulose component of the solids may be derived from any of a variety of wood and non-wood sources through a number of processes used to separate hemicellulose from cellulose pulp. The distinction between wood and non-wood sources of hemicellulose is known in the art and is not further delineated herein. In a particularly useful embodiment, the hemicellulose may be derived from a non-wood source. In another embodiment, greater than 80 or 85 or 90 or 95 or 99 weight % of the hemicellulose may be derived from a non-wood source. In still a further embodiment, all or substantially all (i.e., greater than 99 weight %) of the hemicellulose may be derived from a non-wood source. Particularly useful non-wood sources of hemicellulose may include agricultural products and grasses and may include species such as wheat straw, rice straw, barley straw, oat straw, rye grass, coastal Bermuda grass, *Arundo donax*, miscanthus, bamboo, sorghum, banana harvest residue, pineapple residue, sugarcane bagasse, nut shell waste, industrial hemp, recreational cannabis residue, kenaf, switchgrass, succulents, alfalfa, corn stover, and, flax straw. Hemicellulose from wood sources may include hemicellulose derived from hardwood and softwood species.

In one embodiment, the hemicellulose compound and lignin may be derived from the same source, which may be a non-wood or wood source or blend thereof.

Whether provided as a blend or copolymer, the lignin-carbohydrate mixture may include (on a total solids basis) a carbohydrate compound in an amount of 1 or about 1 weight % (or 5 or about 5 or 10 or about 10 or 15 or about 15 weight %) to 20 or about 20 weight % (or 10 or about 10 or 15 or about 15 or 18 or about 18 weight %) solids.

Within the lignin-carbohydrate mixture, the ratio (by weight) of lignin to hemicellulose may be from 20:1 to 1:1.

The solids portion of the fertilizer composition may in addition to the lignin-carbohydrate mixtures, further include an inorganic salt. Examples of inorganic salts which may be included within the fertilizer composition include but are not limited to phosphate salts and potassium salts.

While the present disclosure contemplates the use of inorganic salts, in other embodiments of the disclosure, all or a portion of the inorganic salt may be replaced with or used in conjunction with an organic compound such as compound selected from one or more of calcium magnesium acetate ($CaMg_2(CH_3COO)_6$), potassium acetate ($CH_3COOK$), potassium formate ($CHO_2K$), sodium formate ($HCOONa$), calcium formate ($Ca(HCOO)_2$), urea ($CO(NH_2)_2$ (also used as additives to sodium chloride), methanol ($CH_4O$), ethanol ($CH_3CH_2OH$, often abbreviated as $C_2H_5OH$ or $C_2H_6$, ethylene glycol ($C_2H_6O_2$), propylene glycol ($C_3H_8O_2$), or glycerol ($C_3H_8O_3$) (or glycerine, glycerin).

Acid

According to certain aspects of the present teaching, an acid is used in the formation of the fertilizer composition. Examples of acids which may be used to form the fertilizer composition include oxy acids. Oxy acids primarily oxidize the lignin (although a certain degree of urea oxidation also occurs) and act as a catalyst or reaction driver assisting with the crosslinking of urea with lignin through nitrogen bonds. Without an oxy acid, the reaction of urea with lignin would result in a very solid reaction product within an ammonia odor. According to certain aspects of the present teaching, the oxy acid utilized to form the fertilizer composition is a peroxy acid. A non-limiting example of an oxy acid which may be used to form the fertilizer composition is peracetic acid. In certain embodiments, the fertilizer composition may include from 0.1 or about 0.1 weight percent (0.5 or about 0.5 or 1 or about 1 or 2 or about 2 or 3 or about 3 or 4 or about 4) to 5 or about 5 weight percent peracetic acid.

Another non-limiting example of a weak oxy acid which may be used in the formation of the fertilizer composition is hydrogen peroxide.

Chelant

The fertilizer composition may include various amounts of chelated compounds. The chelant protects the lignin and acid (e.g., peracetic acid) from reacting in an unfavorable way. The chelant further prevents the formation of a solid precipitate at room temperature within the fertilizer composition when in liquid form. In addition, the it is desirable for the fertilizer composition to retain ammonia as a source of nitrogen for fertilization. As such, a fertilizer composition which provides an ammonia scent is an indicator that ammonia is being released from the fertilizer to the atmosphere and is undesirable. In the present case, it is believed that the chelant assists in obtaining a reaction product wherein the fertilizer composition has no ammonia odor or smell or minimal ammonia odor or smell. According to certain aspects of the present teaching, the fertilizer composition includes pentetic acid or diethylenetriaminepentaacetic acid (DTPA) as a chelated compound. According to further aspects of the present teaching, the chelated compound is ethylenediaminetetraacetic acid (EDTA) or diethylenetriamine penta(methylenephosphonic) acid (DTMPA). The conjugate base of DTPA and EDTA has a high affinity for metal cations which allows for improved uptake of various minerals.

Phosphate

The fertilizer composition may optionally include one or more phosphates. The phosphates may function as a source of phosphorous within the fertilizer. Phosphorous is a nutrient within the fertilizer which contributes to the growth of the plant. Examples of phosphates which may be included within the fertilizer composition include but are not limited to sodium phosphate, calcium phosphate and potassium phosphate in amounts up to 5 weight % or about 5 weight %.

Solvent

The solvent of the fertilizer may, in many useful embodiments, include water.

Other Additives

The fertilizer composition does not include any surfactants or crosslinking agents. However, it is contemplated that certain embodiments of the fertilizer composition may include at least one surfactant or crosslinking agent as an additive.

Useful surfactants may include sodium dodecylbenzene sulfonate, ethoxylated alcohol and sodium lauryl sulfate. The surfactant may be used in an amount of 0.1 weight % (or 0.5 or 1.0 or 2.0 or 5.0 weight %) to 10 weight % (or 6.0 or 8.0 weight %) with respect to the total weight of the composition.

The bond between the lignin or organic material and urea may be formed without the use of crosslinking agents. In other words, crosslinking agents are not required or necessary to assist in forming the bond between the lignin or organic material and urea. However, the use of crosslinking agents to form the fertilizer composition is not prohibited. Examples of crosslinking agents to form the fertilizer composition include but are not limited to zinc, borax and acetone/formaldehyde, etc.

Sulfur

The fertilizer composition may include relatively low amounts of sulfur. According to certain aspects of the present teaching the fertilizer composition may include less than 2 weight percent sulfur. Sulfur in relatively small amounts within the fertilizer composition may function as a beneficial mineral for fertilization of plants. According to certain aspects of the present teaching, the fertilizer composition may include sulfur in an amount not more than 1500 parts per million (ppm) (or 1200 or 1000 or 500, or 100 or 50 ppm) of the total weight of the composition. In some instances, the composition may include sulfur, wherein the source of the sulfur is the same as the source of the lignin. In this respect, sulfur derived from wood or non-wood pulp sources may be included in the fertilizer composition.

Anthraquinone

The fertilizer composition of the present disclosure will further be substantially free of anthraquinone (anthracene-dione) in that it contains no anthraquinone to less than 0.1 weight % (or 0.2 or 0.5 or 1.0 or 2.0 weight %) anthraquinone of the total weight of the composition. Anthraquinone is often utilized in the processing of wood and non-wood pulp sources.

pH of the Fertilizer Composition

The fertilizer composition of the present disclosure may be neutral to acidic to basic, that is, having a pH of about 7.0 (neutral); less than 7.0 or about 7.0 (acidic); or greater than 7.0 or about 7.0 (basic). In some embodiments, the pH may be 7.85. In other embodiments, the pH may be 8.5, less than 8.5 or about 8.5; or 8.0, less than 8.0 or about 8.0; or 7.0, less than 7.0 or about 7.0; or 6.5, less than 6.5 or about 6.5; or 6.0, less than 6.0 or about 6.0; or about 5.5 or 5.5. In some embodiments, the pH of the fertilizer composition may be between about 5.5 and about 8.5. To decrease the pH of the fertilizer composition to the desired acidic range, the composition may include acidic compounds in an amount suit-able to adjust the pH of the composition. A variety of acidic compounds may be used. Exemplary acidic pH adjustment agents may include but are not limited to phosphoric acid, sulphuric acid, nitric acid, formic acid. To increase the pH of the fertilizer composition to the desired basic range, the composition may include basic compounds in an amount suitable to adjust the pH of the composition. A variety of basic compounds may be used. Exemplary basic pH adjust-ment agents may include but are not limited to sodium hydroxide, potassium hydroxide, magnesium hydroxide.

Method of Making the Fertilizer Composition

The fertilizer composition of the present disclosure may be prepared by mixing the solids and solvent in a suitable container and blending or agitating the mixture until the stable dispersion is achieved. As noted above, the pH of the fertilizer composition may be modified by addition of a suitable pH adjustment agent. According to certain embodi-ments, a lignin-based stream is reacted with urea under heat to create a nitrogen enhanced solution. In an exemplary reaction, about 40 to about 60 weight percent of a lignin-based stream (e.g., wheat straw liquor) and about 40 to about 60 weight percent urea are combined and treated with 5% peracetic acid and about 0.05 to about 0.5 weight percent chelant (DTPA). The solution is heated to a temperature of ranging from about 60 or about 60 to 120 or about 120 degrees Celsius (in certain cases 90 or about 90 degrees Celsius) and allowed to react for two hours. The end product obtained is a sprayable liquid fertilizer including approxi-mately 46 weight percent solids. According to certain aspects of the present teaching, the fertilizer has no ammonia odor and a pH of 7.85 or from about 5.5 to about 8.5.

The liquid form of the lignin-urea agricultural fertilizer may be applied by either spraying the solution to leaves of the plant or on the soil. In addition to being made in liquid form, the lignin-urea agricultural fertilizer may also be made in solid form by spray drying or pelletizing (i.e., forming pellets).

In another embodiment, the lignin and hemicellulose of the fertilizer composition of the present disclosure may be derived from the processing of wood or non-wood pulp source materials. While many processes for separating cel-lulose from lignin and hemicellulose are known, the present disclosure is directed to compositions including the lignin and hemicellulose byproducts of such processes. It is known that some processes for separating cellulose from lignin and hemicellulose involve dissolving lignin and hemicellulose from wood or non-wood sources using a solvent of some sort; however, these byproducts will typically exceed one or more of the sulfur, anthraquinone, or pH limits taught herein. Moreover, pulping processes that involve use of high tem-peratures (greater than about 150° C.) typically yield byproducts that evidence high levels of highly condensed lignin which lead to higher average molecular weights.

In still another embodiment, the solvent of the fertilizer composition of the present disclosure may include a portion of the fluid used in processing the wood or non-wood source from which at least a portion of the lignin and hemicellulose solids in the fertilizer composition was derived. In some embodiments, all or substantially all of the solvent may be drawn from the fluid used in processing the wood or non-wood source from which all or substantially all of the lignin and hemicellulose solids in the fertilizer composition was derived.

According to Clause 1, provided is a fertilizer composi-tion including: (i) a lignin in an amount of 5 or about 5 (or 10 or about 10 or 15 or about 15 or 20 or about 20 or 25 or about 25) to 30 or about 30 weight percent solids; (ii) a carbohydrate in an amount of 1 or about 1 (or 5 or about 5 or 10 or about 10 or 15 or about 15) to 20 or about 20 (or 10 or about 10 or 15 or about 15 or 18 or about 18) weight percent solids, wherein the lignin and carbohydrate form a lignin-carbohydrate mixture; and (iii) a urea moiety bonded to the lignin-carbohydrate mixture; wherein the fertilizer composition has a pH in the range of 5.5 or about 5.5 to 8.5 or about 8.5, wherein the fertilizer composition optionally includes either an acidic pH adjustment agent or a basic pH adjustment agent to achieve an acidic or basic pH.

According to Clause 2, the fertilizer composition of Clause 1, wherein the fertilizer composition is in liquid or solid form.

According to Clause 3, the fertilizer composition of Clause 1 or Clause 2 including a solvent borne blend of solids, the solids including lignin, carbohydrate and urea and the solvent including water, wherein the solvent includes a stable aqueous dispersion.

According to Clause 4, the fertilizer composition of any of Clauses 1-3, wherein the lignin-carbohydrate mixture is a blend or a copolymer of lignin and carbohydrate.

According to Clause 5, the fertilizer composition of any of Clauses 1-4, wherein the carbohydrate is hemicellulose.

According to Clause 6, the fertilizer composition of any of Clauses 1-5, wherein at least 90 weight percent (or 95 or 97 or 98 or 99 weight percent) of the carbohydrate is derived from hemicellulose.

According to Clause 7, the fertilizer composition of any of Clauses 1-6, wherein the lignin and carbohydrate include less than 2 weight percent sulfur.

According to Clause 8, the fertilizer composition of any of Clauses 1-7, wherein the lignin includes less than 3500 Da average molecular weight (or 2500 or 1500 Da).

According to Clause 9, the fertilizer composition of any of Clauses 1-8, wherein the solids are substantially free of monosaccharides in that the solids include monosaccharides in an amount of less than 0.1 weight percent (or 0.2 or 0.5 or 1.0 or 2.0 weight percent) solids.

According to Clause 10, the fertilizer composition of any of Clauses 1-9, wherein substantially all of the hemicellulose and substantially all of the lignin is derived from a non-wood source and wherein the non-wood source of lignin and hemicellulose is selected from the group consisting of wheat straw, rice straw, barley straw, oat straw, rye grass, coastal Bermuda grass, *Arundo donax*, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and, flax straw.

According to Clause 11, the fertilizer composition of any of Clauses 1-10, wherein the fertilizer composition is substantially free of anthraquinone.

According to Clause 12, the fertilizer composition of any of Clauses 1-11, wherein the composition further includes phosphates.

According to Clause 13, the fertilizer composition of any of Clauses 1-12, wherein the phosphates include at least one of sodium phosphate, calcium phosphate and potassium phosphate in amounts up to 5 weight percent or about 5 weight percent.

According to Clause 14, the fertilizer composition of any of Clauses 1-13, wherein the nitrogen content ranges between 10 or about 10 to 25 or about 25 weight percent.

According to Clause 15, the fertilizer composition of any of Clauses 1-14, wherein the fertilizer composition does not exhibit an ammonia odor or scent achieved by using an oxy acid as a catalyst assisting with the crosslinking of urea with lignin through nitrogen bonds.

According to Clause 16, the fertilizer composition of Clause 15, wherein the oxy acid is a peroxy acid.

According to Clause 17, the fertilizer composition of Clause 16, wherein the peroxy acid is at least one of peracetic acid and hydrogen peroxide.

According to Clause 18, the fertilizer composition of any of Clauses 1-17 further including a chelated compound to protect the lignin and oxy acid from reacting and to prevent the formation of a solid precipitate at room temperature within the fertilizer composition when in liquid form.

According to Clause 19, the fertilizer composition of any of Clauses 1-18, wherein the chelated compound is at least one of pentetic acid, diethylenetriaminepentaacetic acid (DTPA), ethylenediaminetetraacetic acid (EDTA) and diethylenetriamine penta(methylenephosphonic) acid (DTMPA).

According to Clause 20, the fertilizer composition of any of Clauses 1-19, wherein the acidic pH adjustment agent is at least one of phosphoric acid, sulphuric acid, nitric acid and formic acid and wherein the basic pH adjustment agent is at least one of sodium hydroxide, potassium hydroxide and magnesium hydroxide.

According to Clause 21, the fertilizer composition of any of Clauses 1-20, wherein the composition is a sprayable liquid fertilizer.

According to Clause 22, the fertilizer composition of any of Clauses 1-20, wherein the fertilizer composition is provided in solid form by spray drying or pelletizing.

According to Clause 23, the fertilizer composition of any of Clauses 1-22, wherein the pH of the fertilizer composition is 7.85.

According to Clause 24, provided is a method for preparing a slow-release solvent borne fertilizer including: providing a lignin-carbohydrate solution; applying urea to the lignin-carbohydrate solution; applying an oxy acid to the lignin-carbohydrate solution; applying a chelant to the lignin-carbohydrate solution; allowing the solution to react at a temperature ranging from 60 or about 60 to 120 or about 120 degrees Celsius; allowing the reaction to occur for a duration of about to two hours, wherein the solvent includes a stable aqueous dispersion.

According to Clause 25, the method of Clause 24, wherein the oxy acid is peracetic acid or hydrogen peroxide.

According to Clause 26, the method of Clause 24 or Clause 25, wherein the oxy acid is 5% peracetic acid.

According to Clause 27, the method of any of Clauses 24-26, wherein the chelant is diethylenetriaminepentaacetic acid (DTPA).

According to Clause 28, the method of any of Clauses 24-27, wherein the solvent borne fertilizer is converted to a solid form fertilizer by spray drying or pelletizing.

According to Clause 29, provided is a method of using a composition as a fertilizer including: providing a composition including: (i) a lignin in an amount of 5 or about 5 (or 10 or about 10 or 15 or about 15 or 20 or about 20 or 25 or about 25) to 30 or about 30 weight percent solids; (ii) a carbohydrate in an amount of 1 or about 1 (or 5 or about 5 or 10 or about 10 or 15 or about 15) to 20 or about 20 (or 10 or about 10 or 15 or about 15 or 18 or about 18) weight percent solids, wherein the lignin and carbohydrate form a lignin-carbohydrate mixture; and (iii) a urea moiety bonded to the lignin-carbohydrate mixture; wherein the fertilizer composition has a pH in the range of 5.5 or about 5.5 to 8.5 or about 8.5, wherein the fertilizer composition optionally includes either an acidic pH adjustment agent or a basic pH adjustment agent to achieve an acidic or basic pH; and, applying the composition to soil.

According to Clause 30, the method of Clause 29, wherein the fertilizer composition is in liquid or solid form.

According to Clause 31, the method of Clause 29 or Clause 30, wherein the composition including a solvent borne blend of solids, the solids including lignin, carbohydrate and urea and the solvent comprising water, wherein the solvent includes a stable aqueous dispersion.

According to Clause 32, the method of any of Clauses 29-31, wherein the lignin-carbohydrate mixture is a blend or a copolymer of lignin and carbohydrate. According to Clause 33, the method of any of Clauses 29-32, wherein the carbohydrate is hemicellulose.

According to Clause 34, the method of any of Clauses 29-33, wherein at least 90 weight percent (or 95 or 97 or 98 or 99 weight percent) of the carbohydrate is derived from hemicellulose.

According to Clause 35, the method of any of Clauses 29-34, wherein the lignin and carbohydrate include less than 2 weight percent sulfur.

According to Clause 36, the method of any of Clauses 29-35, wherein the lignin includes less than 3500 Da average molecular weight (or 2500 or 1500 Da).

According to Clause 37, the method of any of Clauses 29-36, wherein the solids are substantially free of monosaccharides in that the solids include monosaccharides in an amount of less than 0.1 weight percent (or 0.2 or 0.5 or 1.0 or 2.0 weight percent) solids.

According to Clause 38, the method of any of Clauses 29-37 wherein substantially all of the hemicellulose and substantially all of the lignin is derived from a non-wood source and wherein the non-wood source of lignin and hemicellulose is selected from the group consisting of wheat straw, rice straw, barley straw, oat straw, rye grass, coastal Bermuda grass, *Arundo donax*, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and, flax straw.

According to Clause 39, the method of any of Clauses 29-38, wherein the fertilizer composition is substantially free of anthraquinone.

According to Clause 40, the method of any of Clauses 29-39, wherein the composition further includes phosphates.

According to Clause 41, the method of any of Clauses 29-40, wherein the phosphates include at least one of sodium phosphate, calcium phosphate and potassium phosphate in amounts up to 5 weight percent or about 5 weight percent.

According to Clause 42, the method of any of Clauses 29-41, wherein the nitrogen content ranges between 10 or about 10 to 25 or about 25 weight percent.

According to Clause 43, the method of any of Clauses 29-42, wherein the fertilizer composition does not exhibit an ammonia odor or scent achieved by using an oxy acid as a catalyst assisting with the crosslinking of urea with lignin through nitrogen bonds.

According to Clause 44, the method of Clause 43 wherein the oxy acid is a peroxy acid.

According to Clause 45, the method of Clause 44, wherein the peroxy acid is at least one of peracetic acid and hydrogen peroxide.

According to Clause 46, the method of Clause 45 further including a chelated compound to protect the lignin and oxy acid from reacting and to prevent the formation of a solid precipitate at room temperature within the fertilizer composition when in liquid form.

According to Clause 47, the method of Clause 46, wherein the chelated compound is at least one of pentetic acid, diethylenetriaminepentaacetic acid (DTPA), ethylenediaminetetraacetic acid (EDTA) and diethylenetriamine penta(methylenephosphonic) acid (DTMPA).

According to Clause 45, the method of any of Clauses 29-47 wherein the acidic pH adjustment agent is at least one of phosphoric acid, sulphuric acid, nitric acid and formic acid and wherein the basic pH adjustment agent is at least one of sodium hydroxide, potassium hydroxide and magnesium hydroxide.

According to Clause 46, the method of any of Clauses 29-45, wherein the composition is in liquid form and wherein the step of applying the composition to soil comprises spraying the liquid composition onto the soil.

According to Clause 47, the method of any of Clauses 29-46, wherein the composition is provided in solid form by spray drying or pelletizing the composition and wherein the step of applying the composition to soil comprises scattering or dusting the composition onto the soil.

According to Clause 48, the method of any of Clauses 29-47, wherein the pH of the fertilizer composition is 7.85.

While the fertilizer composition, method of preparing a fertilizer composition, method of using composition as a fertilizer and associated components and processes have been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the present disclosure should not be limited to any single embodiment, but rather construed in breadth and scope in accordance with the recitations of the appended claims.

Having thus described the lignin-urea agricultural fertilizer, it is now claimed:

What is claimed is:

1. A fertilizer composition comprising:
(i) a lignin in an amount of 5 or about 5 to 30 or about 30 weight percent solids;
(ii) a carbohydrate in an amount of 1 or about 1 to 20 or about 20 weight percent solids,
wherein the lignin and carbohydrate form a lignin-carbohydrate mixture; and
(iii) a urea moiety bonded to the lignin within the lignin-carbohydrate mixture;
wherein the fertilizer composition has a pH in the range of 5.5 or about 5.5 to 8.5 or about 8.5, wherein the fertilizer composition optionally comprises either an acidic pH adjustment agent or a basic pH adjustment agent to achieve an acidic or basic pH,
wherein the fertilizer composition is in liquid form comprising about 46 weight percent solids, and
wherein the fertilizer composition does not include a coating, does not include any crosslinking agents, and does not include any surfactants.

2. The fertilizer composition of claim 1 comprising a solvent borne blend of solids, the solids comprising lignin, carbohydrate and urea and the solvent comprising water, wherein the solvent comprises a stable aqueous dispersion.

3. The fertilizer composition of claim 2, wherein the lignin-carbohydrate mixture is a blend or a copolymer of lignin and carbohydrate.

4. The fertilizer composition of claim 3, wherein the carbohydrate is hemicellulose.

5. The fertilizer composition of claim 4, wherein at least 90 weight percent of the carbohydrate is derived from hemicellulose.

6. The fertilizer composition of claim 4, wherein the lignin and carbohydrate comprise less than 2 weight percent sulfur.

7. The fertilizer composition of claim 1, wherein the lignin comprises less than 3500 Da average molecular weight.

8. The fertilizer composition of claim 1, wherein the carbohydrate is substantially free of monosaccharides in that the carbohydrate comprises monosaccharides in an amount of less than 0.1 weight percent solids.

9. The fertilizer composition of claim 5, wherein substantially all of the hemicellulose and substantially all of the lignin is derived from a non-wood source and wherein the non-wood source of lignin and hemicellulose is selected from the group consisting of wheat straw, rice straw, barley straw, oat straw, rye grass, coastal Bermuda grass, arundo donax, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and, flax straw.

10. The fertilizer composition of claim 1, wherein the fertilizer composition is substantially free of anthraquinone.

11. The fertilizer composition of claim 1, wherein the composition further comprises phosphates.

12. The fertilizer composition of claim 11, wherein the phosphates comprise at least one of sodium phosphate, calcium phosphate and potassium phosphate in amounts up to 5 weight percent or about 5 weight percent.

13. The fertilizer composition of claim 1, wherein the composition comprises a nitrogen content, wherein the nitrogen content ranges between 10 or about 10 to 25 or about 25 weight percent.

14. The fertilizer composition of claim 13, wherein the fertilizer composition does not exhibit an ammonia odor or scent achieved by using an oxy acid as a catalyst which assists with crosslinking urea with lignin through nitrogen bonds.

15. The fertilizer composition of claim 14, wherein the oxy acid is a peroxy acid.

16. The fertilizer composition of claim 15, wherein the peroxy acid is at least one of peracetic acid and hydrogen peroxide.

17. The fertilizer composition of claim 16 further comprising a chelated compound to protect the lignin and oxy acid from reacting and to prevent the formation of a solid precipitate at room temperature within the fertilizer composition when in liquid form.

18. The fertilizer composition of claim 17, wherein the chelated compound is at least one of pentetic acid, diethylenetriaminepentaacetic acid (DTPA), ethylenediaminetetraacetic acid (EDTA) and diethylenetriamine penta(methylenephosphonic) acid (DTMPA).

19. The fertilizer composition of claim 2, wherein the acidic pH adjustment agent is at least one of phosphoric acid, sulphuric acid, nitric acid and formic acid or wherein the basic pH adjustment agent is at least one of sodium hydroxide, potassium hydroxide and magnesium hydroxide.

20. The fertilizer composition of claim 2 comprising a sprayable liquid fertilizer.

21. The fertilizer composition of claim 2, wherein the fertilizer composition is provided in solid form by spray drying or pelletizing.

22. A method for preparing the fertilizer composition of claim 1 comprising:

providing a lignin-carbohydrate solution;

applying urea to the lignin-carbohydrate solution;

applying an oxy acid to the lignin-carbohydrate solution, wherein the oxy acid is peracetic acid or hydrogen peroxide;

applying a chelant to the lignin-carbohydrate solution, wherein the chelant is diethylenetriaminepentaacetic acid (DTPA);

allowing the solution to react at a temperature ranging from 60 or about 60 to 120 or about 120 degrees Celsius; and allowing the reaction to occur for a duration of about two hours, thereby obtaining the fertilizer composition.

23. A method of using a composition as a fertilizer comprising:

providing a fertilizer composition comprising:

(i) a lignin in an amount of 5 or about 5 to 30 or about 30 weight percent solids;

(ii) a carbohydrate in an amount of 1 or about 1 to 20 or about 20 weight percent solids, wherein the lignin and carbohydrate form a lignin-carbohydrate mixture; and (iii) a urea moiety bonded to the lignin within the lignin-carbohydrate mixture;

(iv) an oxy acid added to the lignin-carbohydrate mixture, wherein the oxy acid is a peroxy acid, wherein the peroxy acid is at least one of peracetic acid and hydrogen peroxide;

(v) a chelated compound added to the lignin-carbohydrate mixture, wherein the chelated compound is at least one of pentetic acid, diethylenetriaminepentaacetic acid (DTPA), ethylenediaminetetraacetic acid (EDTA) and diethylenetriamine penta(methylenephosphonic) acid (DTMPA);

wherein the fertilizer composition has a pH in the range of 5.5 or about 5.5 to 8.5 or about 8.5, wherein the fertilizer composition optionally comprises either an acidic pH adjustment agent or a basic pH adjustment agent to achieve an acidic or basic pH;

wherein the fertilizer composition is in liquid form and comprises a solvent borne blend of solids in water, the solids comprising lignin, carbohydrate and urea;

wherein the fertilizer composition comprises about 46 weight percent solids;

wherein the fertilizer composition is a stable aqueous dispersion;

wherein the fertilizer composition does not include a coating, does not include any crosslinking agents, and does not include any surfactants;

wherein the lignin-carbohydrate mixture is a blend or a copolymer of lignin and carbohydrate, wherein at least 90 weight percent of the carbohydrate is derived from hemicellulose;

wherein the lignin and carbohydrate comprise less than 2 weight percent sulfur;

wherein the lignin comprises less than 3500 Da average molecular weight;

wherein the solids are substantially free of monosaccharides in that the solids comprise monosaccharides in an amount of less than 0.1 weight percent solids;

wherein substantially all of the hemicellulose and substantially all of the lignin is derived from a non-wood source and wherein the non-wood source of lignin and hemicellulose is selected from the group consisting of wheat straw, rice straw, barley straw, oat straw, rye grass, coastal Bermuda grass, arundo donax, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and, flax straw;

wherein the fertilizer composition is substantially free of anthraquinone;

wherein the fertilizer composition further comprises phosphates at least one of sodium phosphate, calcium phosphate and potassium phosphate in amounts up to 5 weight percent or about 5 weight percent;

wherein the nitrogen content of the fertilizer composition ranges between 10 or about 10 to 25 or about 25 weight percent; and, applying the fertilizer composition to soil.

* * * * *